United States Patent [19]

Bland

[11] Patent Number: 5,179,839
[45] Date of Patent: Jan. 19, 1993

[54] ALTERNATIVE CHARGING METHOD FOR ENGINE WITH PRESSURIZED VALVED CELL

[76] Inventor: Joseph B. Bland, P.O. Box 1097, Solvang, Calif. 93463

[21] Appl. No.: 475,824

[22] Filed: Feb. 6, 1990

[51] Int. Cl.$^5$ ............................................. F02B 19/18
[52] U.S. Cl. ...................................... 60/712; 123/286; 123/292
[58] Field of Search ............... 123/316, 286, 292, 662; 60/650, 682, 370, 407, 412, 712, 721

[56] References Cited

U.S. PATENT DOCUMENTS

| | | | |
|---|---|---|---|
| 887,703 | 5/1908 | Sharpneck | 123/292 |
| 1,594,664 | 8/1926 | Congellier | 123/316 |
| 4,442,809 | 4/1984 | Nohira et al. | 123/316 |
| 4,817,388 | 4/1989 | Bland | 60/721 |
| 4,829,958 | 5/1989 | Duret | 123/316 |

*Primary Examiner*—Allen M. Ostrager
*Attorney, Agent, or Firm*—Christie, Parker & Hale

[57] ABSTRACT

An internal combustion engine of the gasoline-burning variety has an essentially constant maximum displacement or volume. This requires compromises in design to achieve acceptable power output at full throttle and reasonable thermal efficiency at cruising power. It would be desirable to have an engine with differing displacements for those operating conditions. However, the mechanical constraints of a conventional engine do not easily permit of that possibility. It is also desirable to separate the process of generating expandable fluid for an engine and the expansion of such fluid. This permits each of the two processes to be more closely optimized. Compression of fluid can be more nearly isothermal, and expansion which approaches truly isentropic expansion may be provided. It would also be desirable to capture waste heat from the combustion products within the expandable fluid for enhancing thermal efficiency of an engine. It has been found possible to charge a cell or chamber with an expandable fluid in such a way that said fluid may be efficiently presented without appreciable pressure fluxuation to an accompanying cyclical expander. It has also been found possible to use such a cell or chamber as a means of creating a true constant-volume heat input process.

12 Claims, 6 Drawing Sheets

ALTERNATIVE CHARGING METHOD FOR ENGINE WITH PRESSURIZED VALVED CELL

RELATED APPLICATION

This application concerns an alternative charging technique for valved cells as the term valved cell is defined in U.S. Pat. No. 4,817,388, entitled ENGINE WITH PRESSURIZED VALVED CELL.

FIELD OF THE INVENTION

This invention relates to an internal combustion engine having an auxiliary combustion chamber for augmented power and thermal efficiency and more broadly to an independently pressurized chamber for use with various types of heat engines.

BRIEF SUMMARY OF THE INVENTION

There is, therefore, provided in practice of this invention according to a presently preferred embodiment a method of operating an engine comprising the steps of compressing a gas to a pressure approximately the same as a pressure cyclically achieved in the engine, temporarily isolating a mass of the compressed gas, and opening communication between the isolated gas and the engine while the isolated gas is at approximately the same pressure as in the engine for intermittently releasing substantially all of the temporarily isolated mass of gas into the engine for expansion.

This method of operating can be performed in an internal combustion engine having a conventional positive-displacement expander with at least one valve for admitting a combustible mixture into the expander and exhausting combustion products therefrom. An auxiliary cell is connected to the expander by an exhaust or transfer valve, and to a source of externally-compressed gas, hereinafter referred to as source gas, by an intake valve.

During a cycle, an input valve to the cell is opened for introducing source gas to the cell, following which the intake valve is closed. Since the transfer valve is also closed at the same time, the cell is effectively charged with compressed gas, hereinafter referred to as cell gas. The input valve to the cell is closed before the beginning of the engine's expansion cycle.

During the compression cycle of the engine and the initial portion of the combustion process, the pressure of the combustible mixture in the expander, hereinafter referred to as expander gas, is increasing. At some point the pressure in the expander gas will momentarily equal the pressure of the cell gas. The transfer valve between the cell and the expander is opened at this point, communicating the cell gas with the expander gas. Ideally, all heat input and mixing of cell gas and expander gas now occurs at constant volume, following which continued expansion by the engine expander will reduce the pressure of the mixed gas, and the gas will begin to flow from the cell. By the end of the exhaust cycle of the engine, the transfer valve is closed and the cycle repeats.

This process, which is disclosed and claimed in U.S. Pat. No. 4,817,388, can be seen as useful for efficiently adding gases to an engine following compression and prior to and/or during expansion, and could thus be thought of as a kind of gaseous fluid injector, which in turn is useful for such things as augmenting the total amount of expandable fluid in the engine, returning otherwise-waste heat to the engine within the augmenting fluid, and adding gaseous and vaporized fuels to an engine. In addition, a novel two stroke engine can be constructed with essentially all of the power provided by the cell gas.

Regarding the specific nature of the invention disclosed herein, it is proposed that, as a means of efficiently charging the valved cell, the timing of the operation of the cell's intake and transfer valves be controlled, in the following manner:

Following the opening of the transfer valve, as expansion in the engine occurs, pressure will eventually begin to drop in the expander gas and a pressure difference between the cell and the expander is created, causing the cell gas to flow into the expander and the pressure in the cell to drop. As expansion continues, the pressure of the cell gas will eventually drop until it reaches the pressure of the source gas. Immediately, the cell intake valve is made to open, thus communicating the source gas with the cell gas. As expansion continues, flow from the cell creates a pressure differential between the cell gas and the source gas, causing the source gas to flow into the cell at the same time that the cell gas flows out. If the source gas were flowing from a large reservoir and the restrictions from manifolding into and out of the cell were minimal, a constant-pressure expansion process would be approximated, with source gas flowing into the cell replacing cell gas flowing into the expander. Eventually, the cell gas would completely replace the source gas, at which point the cell exhaust and intake valves are made to close.

The result of this unique process is the thermodynamically efficient charging of the cell with a fresh quantity of source gas.

BRIEF DESCRIPTION OF THE DRAWINGS

These and other features and advantages of the present invention will be appreciated as the same becomes better understood by reference to the following detailed description, when considered in connection with the accompanying drawings, wherein.

DETAILED DESCRIPTION

Figure 1:
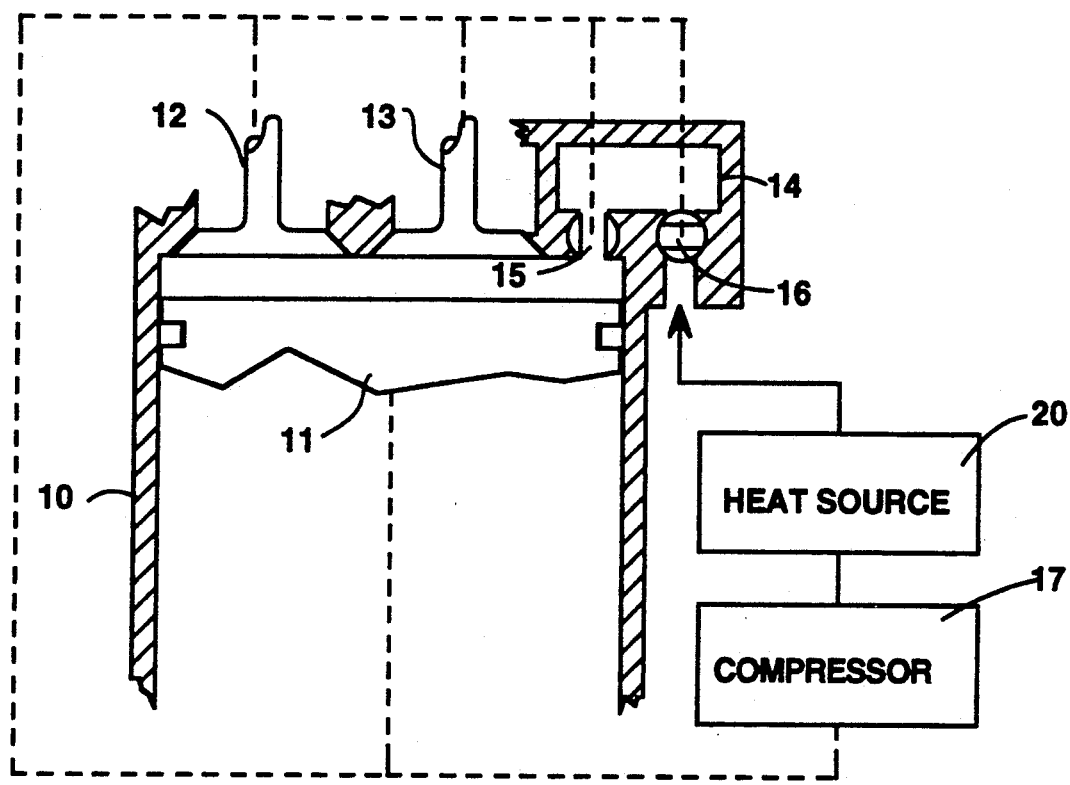
FIG. 1 is a semi-schematic cross-section of an internal combustion engine constructed according to principles of this invention at the end of its compression stroke.

FIG. 1 illustrates largely schematically an internal combustion engine suitable for practice of this invention. Only one cylinder 10 and power piston 11 for such an engine is illustrated. It will be understood that this is merely representative of one of a plurality of such structures that make up such an engine. Other portions of the engine are conventional. Thus, the crankshaft, camshaft, etc., of the engine are not specifically illustrated, but instead, the mechanical interconnection to coordinate operation of the engine, transmit power, etc., are merely indicated by dashed lines.

Each cylinder in the engine has an intake valve 12 and an exhaust valve 13 illustrated in their closed positions. A spark plug for the cylinder is not indicated in the drawing and it will be understood that the internal combustion engine may operate on either an Otto or Diesel cycle. This description is in the context of a four-stroke Otto cycle.

Each cylinder of the engine has a cylindrical valved cell 14. For purposes of the schematic illustration, the valved cell is illustrated integral with the cylinder. All that is required is as short a fluid communication as possible between cell and cylinder. A transfer valve 15, shown in its open position in FIG. 1, interconnects the cell and cylinder. An input valve 16 interconnects the cell with a compressor 17. The compressor may, for example, be a conventional supercharger or turbocharger or other suitable gas compressing structure. The compressor is by preference multi-staged and intercooled. A single such compressor may be used for all of the valved cells of a multiple cylinder engine. A heat source may be placed between the compressor 17 and the valved cell 14. Rotary valves 15 and 16 are illustrated in this embodiment. Other types of valve structure may also be employed.

Figure 2:
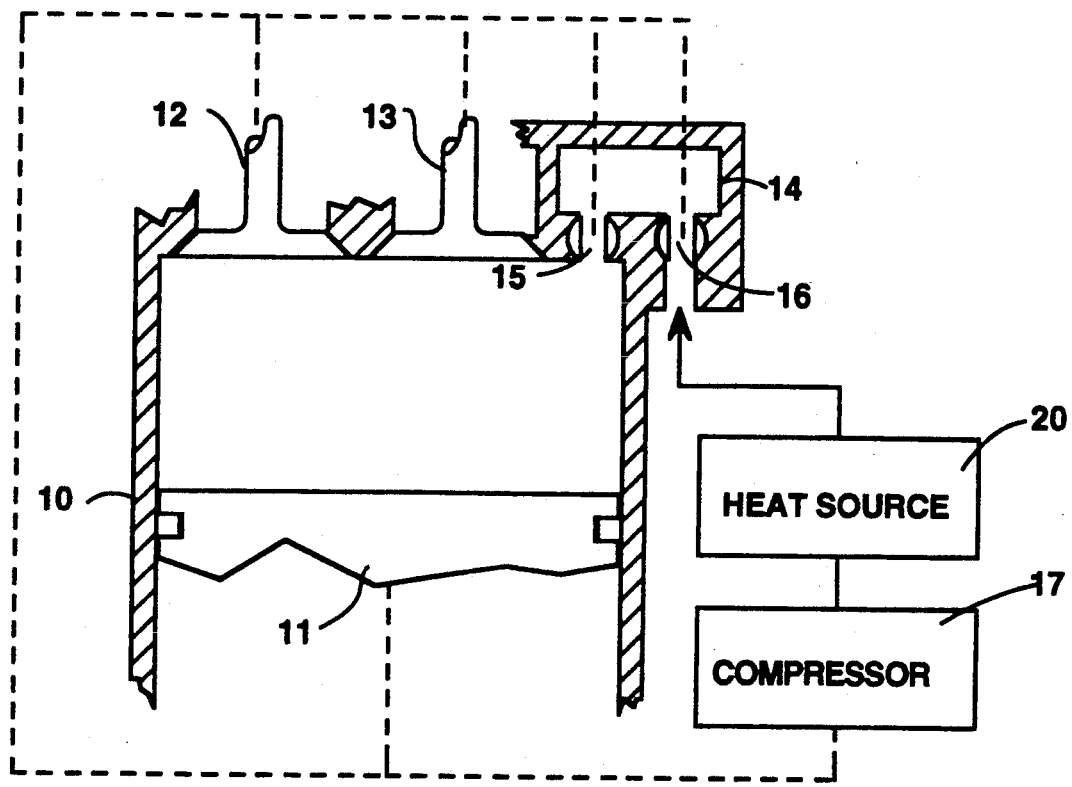
FIG. 2 illustrates the engine of FIG. 1 as the source gas begins displacing the cell gas.

Two different stages of operation of the internal combustion engine are represented schematically in FIGS. 1 and 2.

FIG. 1 illustrates the engine with the power piston at or near top dead center. At about this time, the transfer valve is opened. Preferably, the transfer valve is opened when pressure in the cell and cylinder are approximately the same. This eases the opening force on the transfer valve. More importantly, it allows the expander gas and the cell gas to communicate without a pressure drop occurring between them, which is thermodynamically undesirable. The compressed gas in the cell in this embodiment is a combustible mixture of air and fuel. Fuel is introduced into the compressed air after the air leaves the compressor. A conventional fuel injection port (not shown) may be used.

Note that there is no limitation placed on the valved cell design regarding the pressures that are permissible within the valved cell. It is only necessary that the pressures on both sides of the transfer valve be approximately equal. Therefore, since almost any required pressure may be created on the engine side of the transfer valve, either by simple compression or combustion or some combination thereof, it is possible to envision that fuel may be injected into the valved cell and combustion may be made to take place prior to the moment of pressure equalization. Since the dimensions of the valved cell may easily be made fixed, the combustion at such a time may be made to occur under a condition of perfectly constant volume.

With the transfer valve open, combustion is initiated in the cylinder by a spark in the Otto cycle or by compression in the Diesel cycle. Combustion occurs in both the cylinder and the combustible mixture in the cell. Thus, the effective mass of combustible mixture is larger than it would be in the absence of the valved cell.

FIG. 2 illustrates the engine part way into the expansion stroke. At this point the pressures in the cylinder and the cell equal the pressure of the source gas for the cell. The cell intake valve has therfore been practically instantaneously opened, with little or no pressure drop occurring during the communication of the source gas with the cell gas, which is thermodynamically preferred. As constant-pressure expansion continues from this point, the cell gas is displaced from the cell by the source gas. When the cell gas has been completely displaced, the cell exhaust valve is closed practically instantaneously, followed by the closure of the intake valve.

The remaining portion of the expansion cycle, as well as the exhaust, intake and compression cycles, are all standard.

With such an embodiment, the cylinder and piston of the engine form an expander which does useful work as the hot, compressed gases expand. By using the valved cell containing a combustible mixture, the expander is presented with an additional charge of fuel and air for expansion which may be nearly isothermally compressed which is more efficient than the process occurring in the cylinder of the internal combustion engine. This amounts to a novel and more efficient type of "supercharging" process. Note that this type of supercharging may be used in conjunction with turbocharging. Also, note that this type of supercharging/turbocharging will not require a reduction of the engine's compression ratio, as is presently the case.

When the engine is operating at partial loads, the valved cell may not be used, the cell transfer valve may be held closed and the engine may operate in a conventional manner. Since the valved cell would essentially be on standby waiting for a demand for additional power from the engine, the throttle setting for the engine at a given cruising speed may be relatively high for high thermal efficiency resulting from the maximum compression ratio thus permitted at partial power output. Power variations may be obtained in this mode of operation by conventional means. However, when a full throttle acceleration is desired, for example, operation of the valved cell may be initiated. This, in effect, augments the power available from the engine by increasing its effective displacement. The added displacement is fed with more nearly isothermally compressed gas rather than gas compressed within a hot engine cylinder. As a result, this mode of supercharging enhances power while retaining better thermal efficiency.

In addition, with such an embodiment it is possible that otherwise-waste heat will be absorbed from the interior of the cell sufficient to obviate the need for additional external cooling of the cell. Also, if the density of the cell gas is greater than the density, following compression, of the expander gas, the net density of the expandable fluids in the engine will have been increased, resulting in an increased ability of the expandable fluids to transform heat into a pressure increase. Finally, different fuel:air mixture ratios may be used in the cell and cylinder as appropriate for efficient combustion and expansion, avoidance of burning of the transfer valve, and the like.

FIGS. 3 thru 6 illustrate largely schematically four different stages of operation of a novel approach to constructing a valved cell which is charged by valve timing. Only one cylinder 110 and power piston 111 for such an engine is illustrated. It will be understood that, as in FIGS. 1 and 2, this is merely representative of one of a plurality of such structures that make up such an engine.

Each cylinder in the engine has an intake valve 112 and an exhaust valve 113 illustrated in their closed positions. A spark plug for the cylinder is not indicated in the drawing and it will be understood that the internal combustion engine may operate on either an Otto or Diesel cycle that is, increasing the molecular activity of the contained compressed gas by adding heat internally as the result of the combustion of fuel, said fuel being added in this instance by a fuel injector 121. This description is in the context of a four-stroke Otto cycle.

Each cylinder of the engine has a cylindrical valved cell 114. For purposes of the schematic illustration, the valved cell is illustrated integral with the cylinder. All that is required is as short a fluid communication as possible between cell and cylinder.

The valved cell includes a piston 118. In this embodiment, the piston is moved and held in place hydraulically by the addition of hydraulic fluid to a hydraulic cylinder 119 through an inlet/exhaust port 128. The hydraulic fluid allows the displacer piston to be adjusted and then fixed in position, thereby allowing the internal volume of the cell to be increased or reduced as desired.

A transfer valve 115, shown in its closed position in FIG. 1, interconnects the cell and cylinder. An cell input valve 116 interconnects the cell with a compressor 117.

Between the cell input valve 116 and the cell compressed gas inlet 135 is a throttle valve 120, which is located in immediate proximity to the cell input valve. A high-pressure fuel injector 121 allows fuel to be injected directly into the cell.

Cell intake valve 116 is lubricated by a variable-flow, high-pressure oiler 124, and transfer valve 115 is lubricated by a variable-flow, high-pressure oiler 125.

Finally, part or all of the compressed gas from the compressor 117 is used to cool the area of the transfer valve by entering port 126 and exhausting port 127 before entering port 135. Following compression by the external compressor 117, the heat source 136 may be used to add heat to the compressed gas.

Four different stages of operation of the internal combustion engine are represented schematically in FIGS. 3 thru 6.

Figure 3:
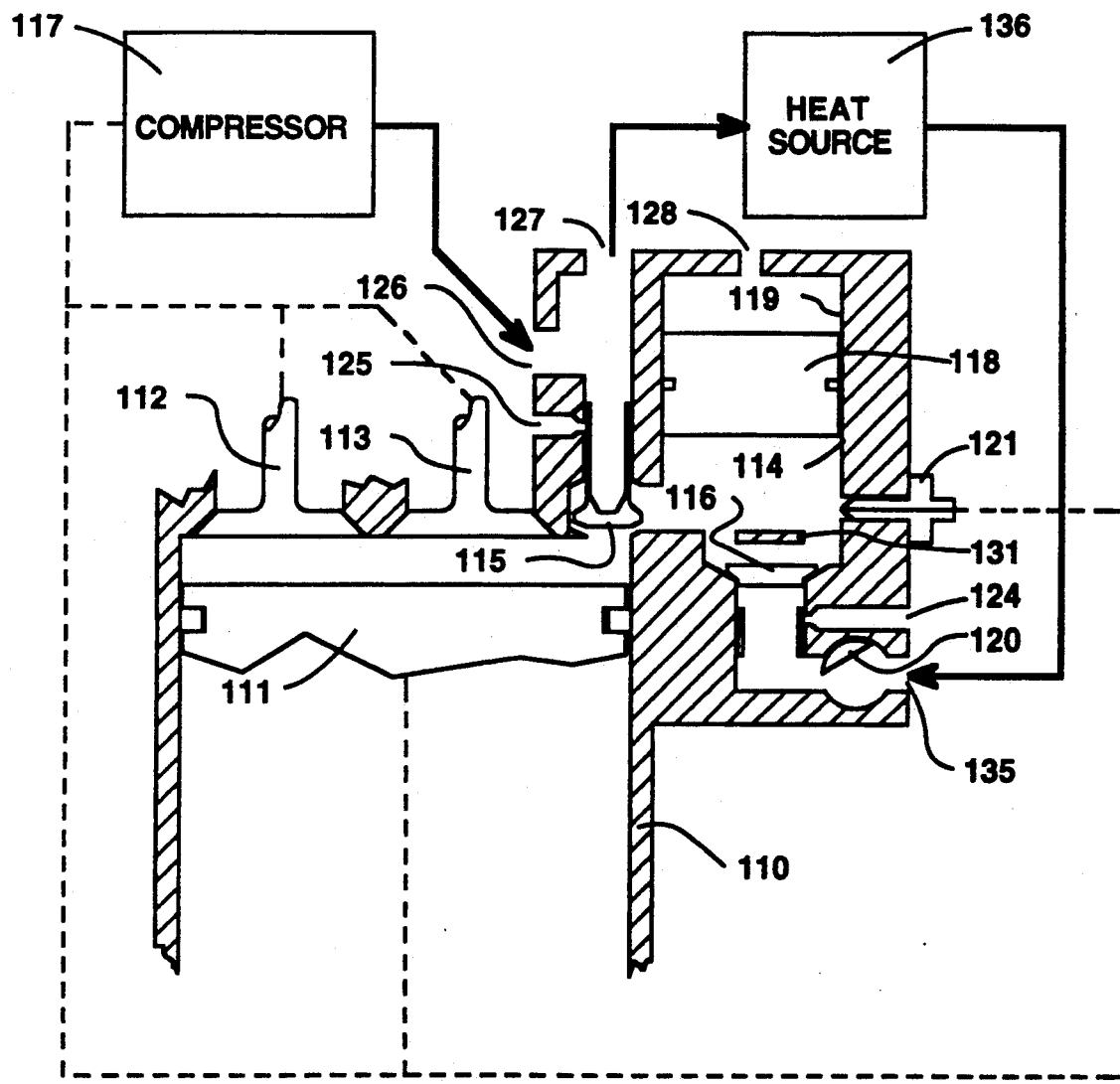
FIG. 3 is a semi-schematic cross-section of a novel internal combustion engine apparatus constructed according to principles of this invention at the end of its compression stroke.

FIG. 3 illustrates the engine with the power piston at or near Top Dead Center. At about Top Dead Center, the transfer valve 115 is made to open. Preferably, the transfer valve is opened when pressure in the cell and cylinder are approximately the same. This allows the expander gas and the cell gas to communicate without a pressure drop occurring between them, which is thermodynamically undesirable.

The transfer valve is basically a lightweight poppet valve with upper and lower valve faces allowing it to "seal" in two directions. In this instance the transfer valve will be shown to open and close largely as a result of pressure differences which cyclically occur across the valve seat and across the valve stem. Note that the compressed gas which communicates with the top of the transfer valve stem through gas inlet 126 flows out gas outlet 127 and into gas inlet 135, which is the inlet through which the cell is charged. Thus, the gas which "charges" the cell through gas inlet 135 is at approximately the same pressure as the gas which communicates with the top of the transfer valve.

Regarding the action of the transfer valve, the transfer valve, when first charged, is held closed against the lower valve seat by the pressure difference across the valve seat, since the expander side of the transfer valve is experiencing the relatively low-pressure processes of exhaust, intake and compression. However, at the end of the compression stroke and in some instances following the initiation of combustion on the expander side of the transfer valve, the pressures on either side of the valve head become approximately equal. Any further pressure increase should thus amount to a pressure difference building across the valve stem, and the valve should begin to open. Any subsequent rise in pressure in the cylinder will then also raise the pressure in the cell, and as the pressure in the cylinder and cell increase a pressure difference is created across the transfer valve stem, effectively forcing the transfer valve to quickly and completely open.

Figure 4:
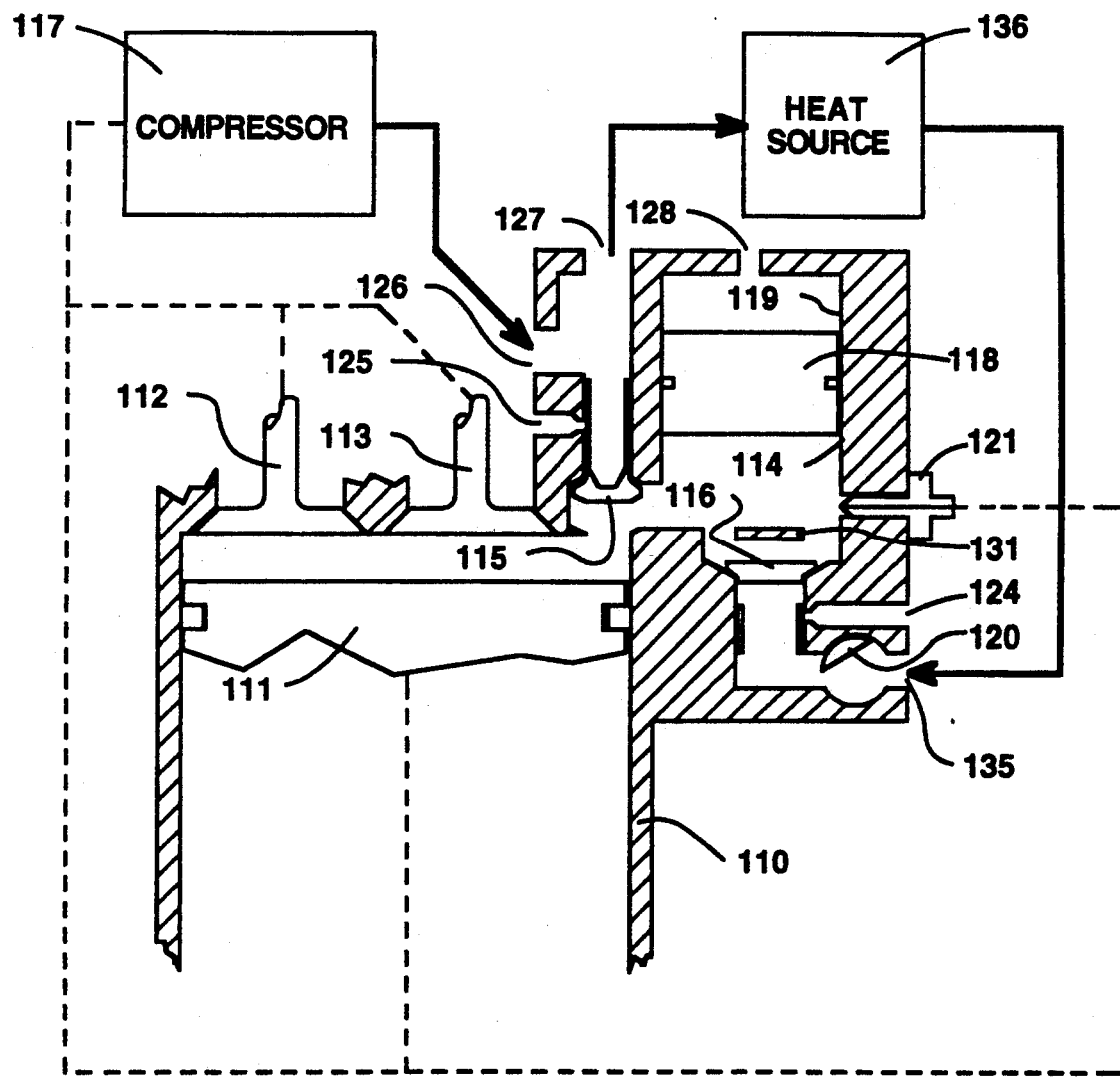
FIG. 4 illustrates the engine of FIG. 3 as combustion proceeds.

In FIG. 4, we see that the transfer valve has opened completely. Note that the transfer valve has sealed against its upper valve seat, serving to isolate the transfer valve stem from any continuing pressure increase within the cell and cylinder, as would occur with internal combustion of fuel.

Figure 5:
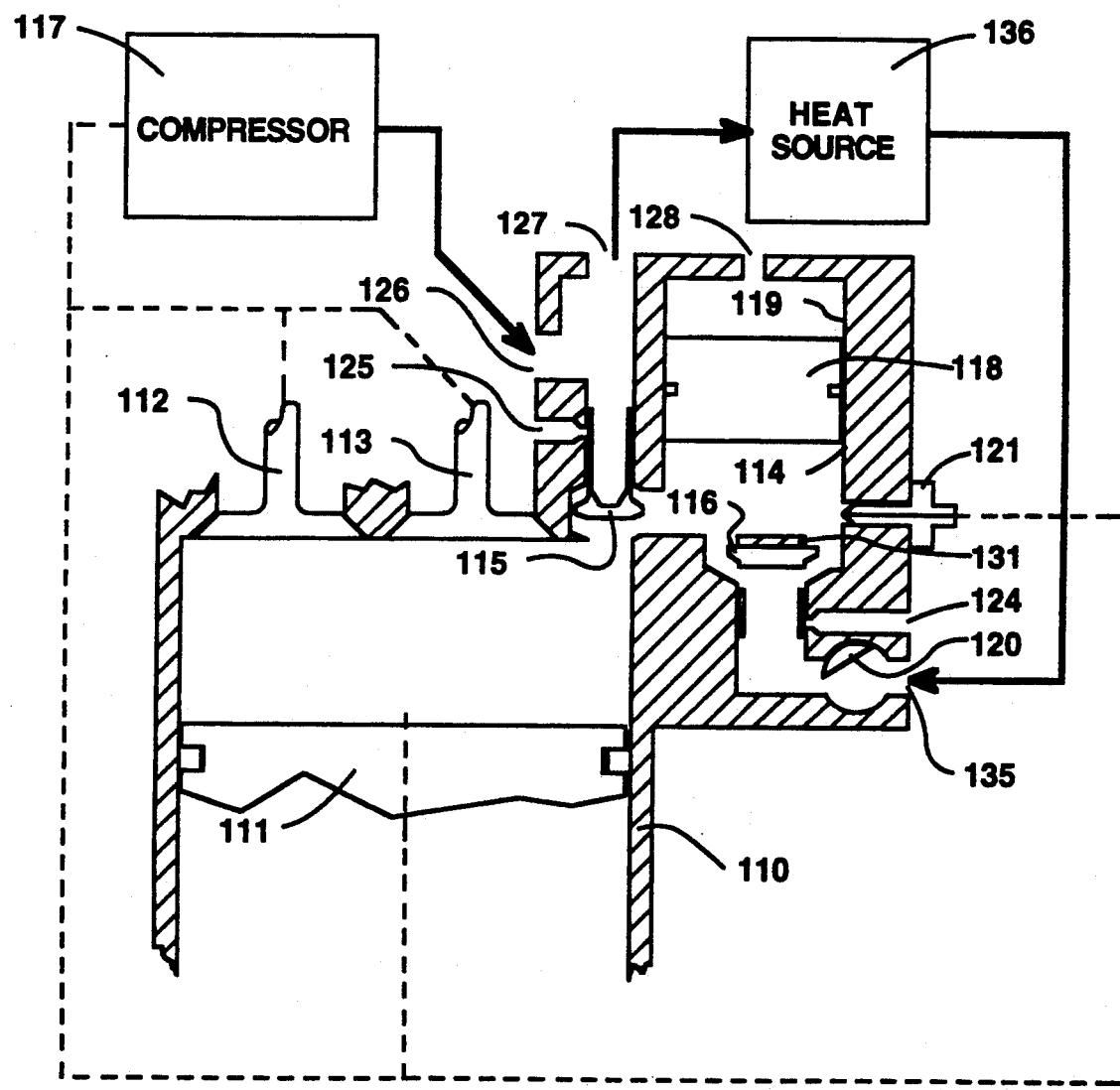
FIG. 5 illustrates the engine of FIG. 3 as the source gas begins displacing the cell gas.

In FIG. 5, the power piston 111 has expanded to the point where the gas pressure in the cylinder and the cell equal the pressure of the source gas flowing from the compressor 117. This is the preferred moment to open the intake valve, since it would allow the cell gas and the source gas to communicate without a pressure drop occurring between them, which is thermodynamically preferable.

Regarding the action of the cell intake valve 116, it is basically a lightweight, flow-actuated, one-way poppet valve, the stem of which is hollow and ported to allow gas flow through the stem. In operation the state of pressure equalization on both sides of intake valve 116 moves valve 116 off its seat. As a result, intake valve 116 opens readily with no appreciable pressure drop in the process, coming to rest against the stop 131.

Figure 6:
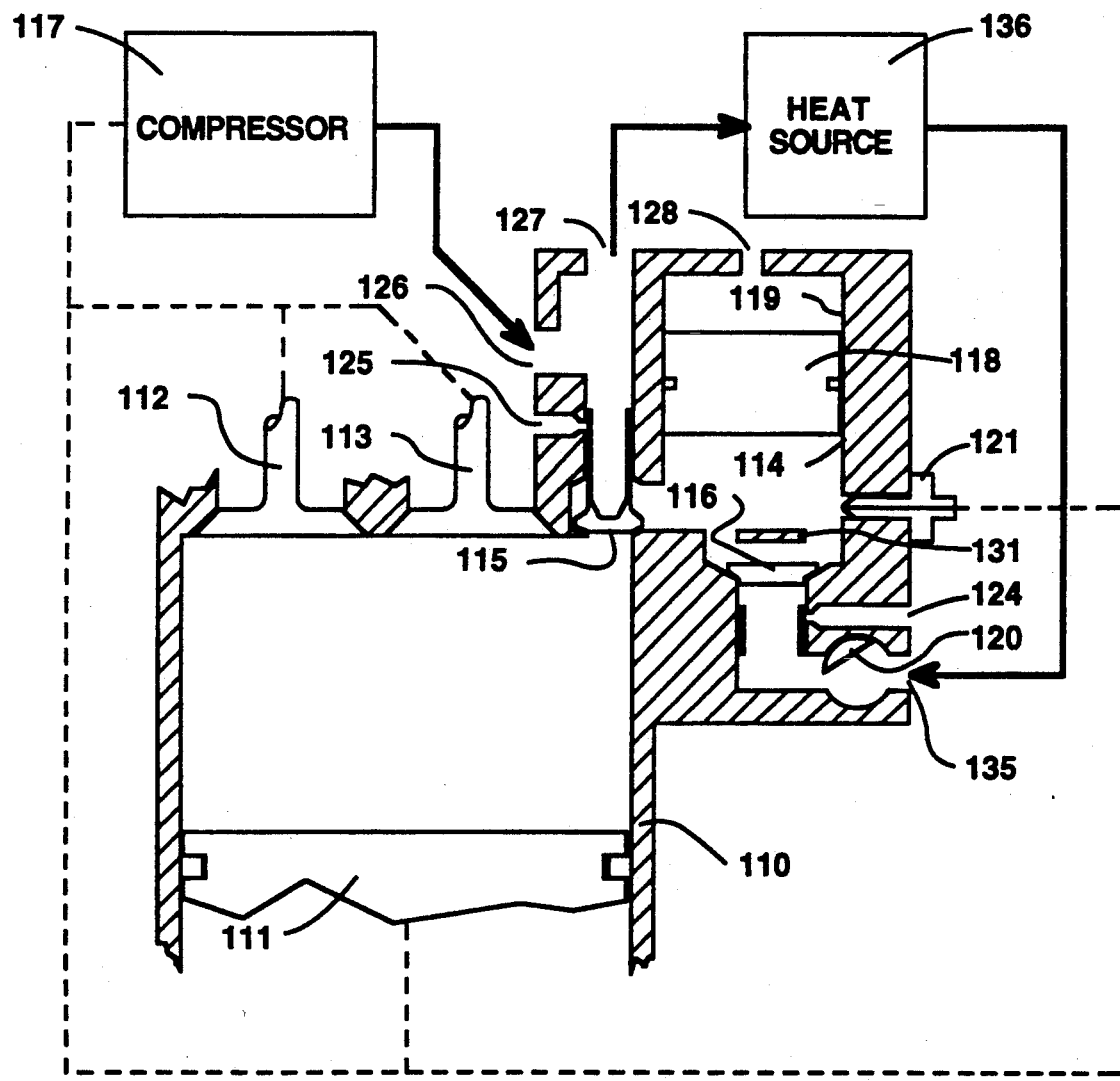
FIG. 6 illustrates the engine of FIG. 3 just as the cell charging process has completed.

In FIG. 6, the power piston has expanded a sufficient amount to have nearly filled the cell with source gas. This source gas has been required to flow through a throttle valve 120, resulting in a slight decrease in pressure below that of the source gas. Therefore, the gas which communicates with the top of the transfer valve through ports 126 and 127 is seen to be at a higher pressure than the gas within the cell. As a result a pressure difference is created across the transfer valve 115 valve stem, causing it to close. Flow into the cell ceases and begins to reverse as a result of surge, thus automatically closing the flow-sensitive intake valve 116. Finally, at some optimum point fuel is injected into the cell with fuel injector 121, which upon combustion will increase the molecular activity of the contained, compressed gas by heat input, and the cell is thus recharged.

It should further be noted that heat input may be accomplished by means other than combustion, such as, for example, conductive heating by an atomic pile, or radiative heating by solar energy.

Although limited embodiments of valved cell engines have been described and illustrated herein, many modifications and variations will be apparent to one skilled in the art. The specific mechanical arrangements of such engines are subject to a broad variety of implementations based on the schematic illustrations provided herein. Variations of the operations may be provided as well. For example, timing of the various valve movements might be controlled, as by computer, taking into account power output, rpm, source gas pressure and the like. Or the valves may operate solely as a result of the inherent creation of pressure differentials and without benefit of mechanical or electromechanical activation, trading off some thermodynamic losses from late valve opening and closing in order to achieve a simple cell construction.

Many other modifications and variations will be apparent to one skilled in the art and it is therefore to be understood that within the scope of the appended claims, the invention may be practiced otherwise than as specifically described.

What is claimed is:

1. A method for efficiently transferring compressed gas into a heat engine which has cyclically-occurring changes in internal gas pressure comprising the steps of:
   a. maintaining a quantity of compressed gas within a cell which is in immediate proximity to a heat engine expander undergoing cyclical changes in internal gas pressure while the heat engine expander has an internal gas pressure that is cyclically lower than the pressure of the compressed gas within the cell;
   b. pressurizing a gas in the heat engine expander by compression or by heating or by some combination of compression and heating;
   c. opening communication between the expander and the cell when the expander's increasing internal gas pressure cyclically matches substantially the pressure of compressed gas within the cell;
   d. opening communication between the cell and a compressed gas source when expansion in the heat engine expander cyclically lowers the cell's internal gas pressure to match the pressure of the compressed gas source;
   e. transferring an amount of the compressed gas from the compressed gas source into the cell at substantially constant pressure at the same time the gas contained by the cell is exhausted from the cell and into the heat engine expander at substantially constant pressure as a result of continued expansion in the heat engine expander;
   f. closing communication between the cell and the heat engine expander when substantially all of the previous charge of gas within the cell has been displaced with the new charge of compressed gas flowing from the compressed gas source;
   g. closing communication between the valved cell and the compressed gas source at effectively the same moment that communication is closed between the valved cell and the heat engine expander, and
   h. cyclically repeating steps a–g.

2. A method for efficiently adding heat at constant volume to a heat engine which has cyclically-occurring changes in internal gas pressure comprising the steps of:
   a. maintaining a quantity of compressed gas at constant volume within a cell which is in immediate proximity to a heat engine expander undergoing cyclical changes in internal gas pressure when the heat engine expander has an internal gas pressure that is cyclically lower than the pressure in the compressed gas;
   b. increasing the molecular activity of the maintained quantity of compressed gas by heat input means;
   c. pressurizing a gas in the heat engine expander by compression or by heating or by some combination of compression and heating until the expander's internal gas pressure cyclically matches substantially the pressure of the previously-received charge of compressed gas within the cell;
   d. opening communication between the expander and the cell when the expander's internal gas pressure cyclically matches substantially the pressure of the charge of compressed gas within the cell;
   e. expanding both the quantity of compressed gas contained within the heat engine expander and the quantity of compressed gas contained within the cell;
   f. recharging the cell with a fresh charge of compressed gas by some means; and
   g. cyclically repeating steps a–f.

3. An engine comprising:
   an expansion chamber capable of undergoing as a minimum the cycles of expansion and exhaust;
   a cell separate from the expansion chamber but in immediate proximity to the expansion chamber;
   a compressed gas source;
   a cell inlet valve means connecting the compressed gas source and the cell;
   a transfer valve means connecting the cell and the expansion chamber;
   heat input means for increasing the molecular activity of the compressed gases over the molecular activity of the gases following compression;
   linkage means for supplying power from the expansion means to the desired work load, an external compressor means, the valve actuation means and any auxiliary power means required for engine operation for:
   (a) pressurizing a gas in an expansion chamber;
   (b) opening the transfer valve when the pressure within the expansion chamber and the pressure within the valved cell are substantially the same;
   (c) opening the cell inlet valve to admit compressed gas from the compressed gas source at substantially constant pressure at the same time the previous charge of gas is exhausted, at substantially constant pressure, from the valved cell and into the heat engine expander; and
   (d) closing the transfer valve between the valved cell and the heat engine expander when substantially all of the previous charge of gas within the valved cell has been displaced with the new charge of gas.

4. An engine as recited in claim 3 wherein the maximum volume of the cell may be varied.

5. An engine as recited in claim 3 wherein the cell transfer valve is a poppet type valve.

6. An engine as recited in claim 3 in which the end of the transfer valve stem opposite the valve head is in an independently pressurized environment.

7. An engine as recited in claim 6 in which the transfer valve opens and closes solely as a result of pressure differences.

8. An engine as recited in claim 3 wherein the cell intake valve is a pressure-actuated one-way valve.

9. An engine as recited in claim 3 wherein there is a throttle valve in close proximity to the cell intake valve and in-line between the cell intake valve and the external gas compressor means.

10. An engine as recited in claim 3 wherein fuel is injected in metered amounts directly into the valved cell.

11. An engine as recited in claim 3 wherein the valves are fitted with a high pressure, high temperature seal.

12. An engine as recited in claim 3 where the valved cell is fitted with a means for initiating combustion such as a spark plug or a glow plug.

* * * * *